United States Patent
Polukort et al.

(12)

(10) Patent No.: US 6,499,303 B1
(45) Date of Patent: Dec. 31, 2002

(54) METHOD AND SYSTEM FOR GAS TURBINE POWER AUGMENTATION

(75) Inventors: Peter Paul Polukort, Berne, NY (US); Jatila Ranasinghe, Niskayuna, NY (US); Charles Michael Jones, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/836,553

(22) Filed: Apr. 18, 2001

(51) Int. Cl.[7] .............................. F02C 6/18; F02C 3/30
(52) U.S. Cl. .................... 60/775; 60/39.182; 60/39.55; 60/39.53
(58) Field of Search ................. 60/775, 39.53, 60/39.55, 39.182

(56) References Cited

U.S. PATENT DOCUMENTS

| | | | | |
|---|---|---|---|---|
| 3,731,495 A | * | 5/1973 | Coveney | ................ 60/39.182 |
| 3,747,336 A | | 7/1973 | Dibelius et al. | |
| 3,796,045 A | * | 3/1974 | Foster-Pegg | ............. 60/39.182 |
| 3,971,210 A | * | 7/1976 | Rose | ........................... 60/726 |
| 5,148,668 A | * | 9/1992 | Frutschi | ........................ 60/775 |
| 5,160,096 A | * | 11/1992 | Perkins et al. | ................ 60/775 |
| 5,181,376 A | * | 1/1993 | Rao | ........................ 60/39.182 |
| 5,349,810 A | | 9/1994 | Landalv | |
| 5,513,488 A | | 5/1996 | Fan | |
| 5,622,044 A | | 4/1997 | Bronicki et al. | |
| 5,778,675 A | | 7/1998 | Nakhamkin | |
| 5,934,063 A | | 8/1999 | Nakhamkin | |
| 6,003,298 A | | 12/1999 | Horner | |
| 6,038,849 A | | 3/2000 | Nakhamkin et al. | |
| 6,119,445 A | | 9/2000 | Bronicki et al. | |

* cited by examiner

Primary Examiner—Ted Kim
(74) Attorney, Agent, or Firm—Nixon & Vanderhye PC

(57) ABSTRACT

A method and apparatus for power augmentation in gas turbine cycles is provided that efficiently provides at least air and preferably both steam and air injection. In an embodiment of the invention, an air injection compressor is driven with steam used for gas turbine injection prior to its injection into the gas turbine. In addition to power output, the thermodynamic efficiency is improved in simple cycle turbine power plants with the disclosed method and apparatus.

14 Claims, 1 Drawing Sheet

METHOD AND SYSTEM FOR GAS TURBINE POWER AUGMENTATION

BACKGROUND OF THE INVENTION

The present invention relates to power augmentation in gas turbine cycles and, more particularly, to an innovative method and system for efficiently combining steam and air injection for gas turbine power augmentation.

It is known that water or steam may be injected into a gas turbine at various points within a cycle to increase the mass flow of motive fluid to augment gas turbine power. However, the maximum amount of steam injection is limited. For example, there is a limit to the amount of steam which may be added into the combustion reaction zone in the liner because of degradation of the combustion process. Indeed, typically the total moisture entering the combustor is limited to 3.5–5% by weight of air flow, which limits the power augmentation capability with steam injection alone.

The use of an external motor driven compressor to inject air and increase gas turbine power output has also been proposed as described in U.S. Pat. Nos. 5,934,063 and 6,038,849. However, the motor power driving the air injection compressor becomes a significant auxiliary load in such systems.

BRIEF SUMMARY OF THE INVENTION

A need remains for a method and system whereby gas turbine power output can be increased while eliminating the auxiliary power load of an air injection compressor.

The invention relates to a cycle in which steam is generated with the gas turbine exhaust energy, for example in a once through or drum boiler, at a pressure higher than required for steam injection, and in which this high pressure steam is expanded through a back pressure steam turbine which then drives an air injection compressor. The steam exhausted from the steam turbine can then be mixed with the air injection compressor discharge prior to injection into the combustion system of the gas turbine.

The cycle as proposed above thus eliminates the auxiliary motor load of an auxiliary air injection compressor, resulting in a cycle design with better power output and thermodynamic efficiency compared to a steam injection cycle, air injection cycle with motor driven compressor, or a combination thereof.

Accordingly, the invention is embodied in a gas turbine cycle comprising a gas turbine system including a compressor for compressing air, a combustion system for receiving compressed air from the compressor and a turbine for converting the energy of the combustion mixture into work; a heat recovery system for receiving exhaust gas from the gas turbine; a steam turbine; a first flow path for water and/or steam at elevated pressure including a first heat exchange flow path disposed in heat exchange relation to the exhaust gas flowing through the heat recovery system, thereby to produce superheated steam therein, and a superheated steam flow path for flowing the superheated steam to the steam turbine for converting the energy of the superheated steam into work; an auxiliary compressor operatively coupled to the steam turbine for being driven thereby to compress air to generate injection air at elevated pressure; and a flow path for the injection air, the injection air flow path being operatively coupled to at least one of the gas turbine compressor discharge and the combustion system of the gas turbine for increasing the mass flow of fluid thereinto. In an exemplary embodiment, there is also a flow path for steam exhausted from the steam turbine that is operatively coupled to at least one of the gas turbine compressor discharge and the combustion system of the gas turbine for increasing the mass flow of fluid thereinto.

In one embodiment, the injection air flow path includes a second heat exchange flow path disposed in heat exchange relation to the heat recovery system for heating the injection air.

As a further feature of one embodiment of the invention, the exhaust steam flow path is operatively coupled to the injection air flow path for mixing the exhaust steam with the injection air. Most preferably, the steam and air are mixed downstream of the second heat exchange flow path.

The invention is further embodied in a method of augmenting power generation with a gas turbine that comprises providing a gas turbine system including a compressor for compressing air, a combustion system for receiving compressed air from the compressor and a turbine for converting the energy of the combustion mixture that leaves the combustion system into work; heating at least one of water and steam at elevated pressure with exhaust gas from the gas turbine to produce superheated steam at elevated pressure; flowing said superheated steam to a steam turbine to convert the energy of the superheated steam into work; driving an auxiliary compressor with said steam turbine thereby to compress air to generate injection air at elevated pressure; and flowing said injection air to and injecting said injection air into at least one of the gas turbine compressor discharge and the combustion system of the gas turbine for increasing the mass flow of fluid thereinto.

In accordance with one embodiment of the invention, the method further comprises flowing steam exhausted from said steam turbine to at least one of the gas turbine compressor discharge and the combustion system of the gas turbine for increasing the mass flow of fluid thereinto. Advantageously, the exhaust steam is mixed with the injection air. Furthermore, the injection air may be heated with exhaust gas from the gas turbine, most preferably before it is mixed with the exhaust steam.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
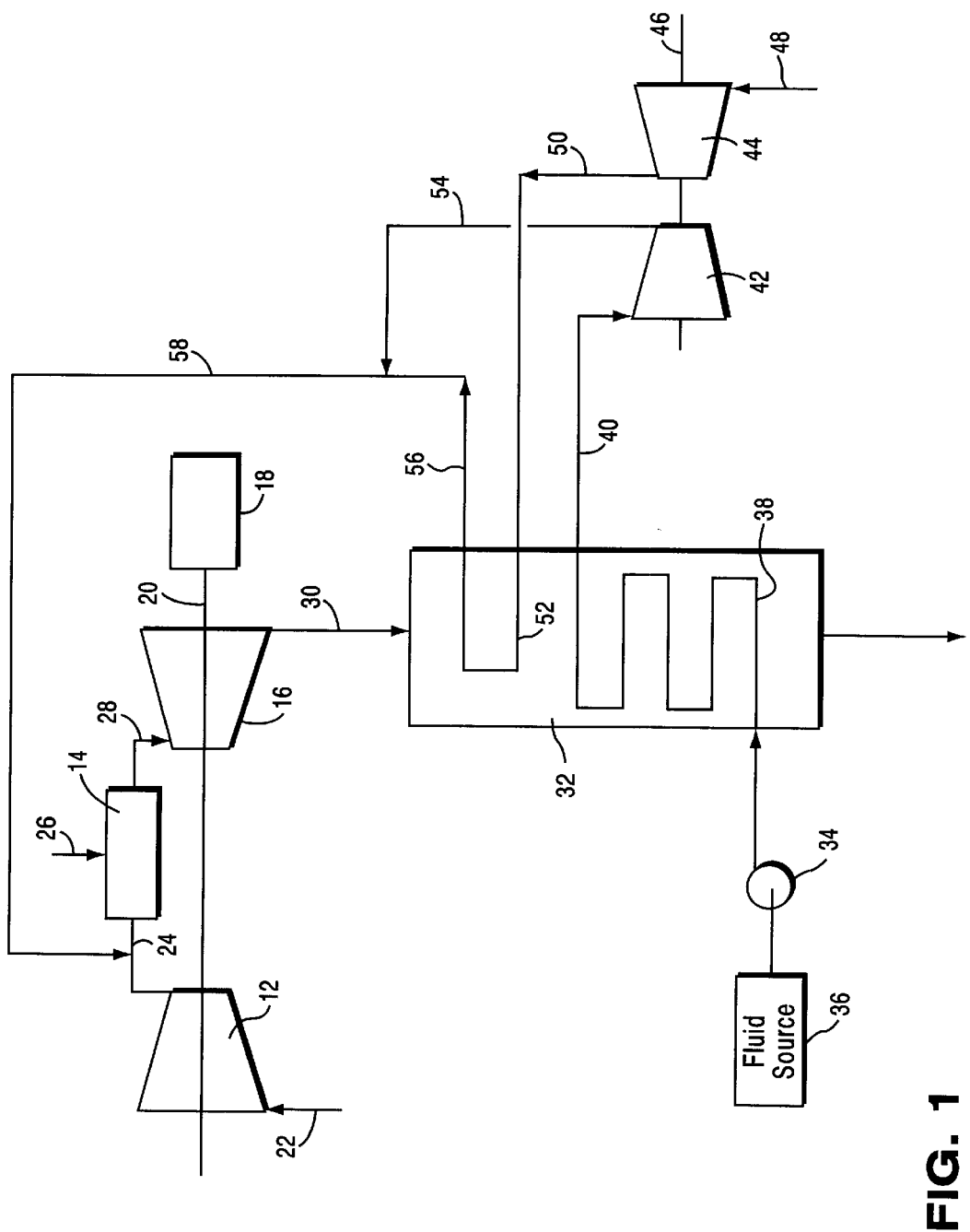
FIG. 1 is a schematic representation of a gas turbine cycle with steam and air injection as an embodiment of the invention.

A gas turbine cycle embodying the invention is schematically illustrated in FIG. 1. The illustrated embodiment includes a gas turbine system 10 comprising a compressor 12, a combustion system 14, and a gas turbine expander 16. The gas turbine 16 drives a generator (or other load) 18 via shaft 20.

More specifically, air 22 enters the axial flow compressor 12, typically at ambient conditions, and is compressed. The compressed air 24 exiting the compressor 12 enters the combustion system where fuel 26 is injected and combustion occurs. The combustion mixture 28 leaves the combustion system and enters the turbine. In the turbine section 16, energy of the hot gases is converted into work. This conversion takes place in two steps. The hot gases are expanded and a portion of the thermal energy is converted into kinetic energy in the nozzle section of the turbine. Then, in the bucket section of the turbine a portion of the kinetic energy is transferred to the rotating buckets and converted to work. A portion of the work developed by the turbine is used to drive the compressor 12 whereas the remainder is available for generating power, i.e., driving a generator (or other load) 18 via shaft 20. The exhaust gas leaves the turbine at 30.

The invention provides a method and system whereby gas turbine power output can be increased while eliminating the auxiliary power load of an air injection compressor. The cycle of the invention proposes to generate steam with the gas turbine exhaust energy, and use that steam to drive an auxiliary compressor for generating injection air for admission to the gas turbine compressor discharge/combustor system. The injection air increases the mass flow of fluid into the generator for power augmentation. In a preferred embodiment, steam exhausted from the compressor drive is also injected into the gas turbine compressor discharge/combustor system. Most preferably, the exhaust steam is mixed with the injection air upstream of the point of admission to the gas turbine compressor discharge/combustor system.

To capture to energy of the exhaust gas 30, the exhaust gas flows to and through a heat exchanger, such as a heat recovery boiler 32. In the presently preferred embodiment the steam is generated at a pressure higher than required for steam injection. Thus, a pump 34 is provided for pumping fluid, for example, water and/or steam, from a source 36 along a first heat exchange flow path 38 for heat exchange with the hot exhaust gas 30 that exits the turbine 16, thereby to produce super heated steam 40 at elevated pressure. The super heated steam is expanded in a back pressure steam turbine 42 which drives an auxiliary compressor 44 via drive shaft 46. Air 48, generally at ambient conditions, enters and is compressed in the auxiliary compressor 44. In the illustrated embodiment, the compressor discharge air is conducted along a flow path 50 that includes a second heat exchange flow path 52 where the compressor discharge air is heated with energy from the gas turbine exhaust gas 30.

The steam exhausted from the back pressure steam turbine 40 is conducted along flow path 54 which is operatively coupled to for being mixed with the heated compressed air stream 56 to produce a hot moist.air stream 58. The hot moist air 58 is conducted to the gas turbine system 10 for admission to the gas turbine compressor discharge/combustor system where the moist air stream mixes with the gas turbine compressor discharge air prior to going to the combustor 14 or during passage through the combustion system. As will be understood, the added mass flow of the moist air increases the power output from the gas turbine section 16.

Since in the presently preferred embodiment the auxiliary compressor 44 is driven by a steam turbine 42 using steam 40 produced by the gas turbine exhaust gas energy, the cycle of the invention will produce more plant power output than a steam injected cycle, a cycle injecting air to the gas turbine with an external motor driven compressor, or a cycle with a combination of the above two options, which is the current state of the art.

It is to be noted that in addition to driving the air injection/auxiliary compressor 44, the steam turbine 42 can be used to drive refrigeration units providing cooling for the gas turbine inlet air 22,48 and/or a generator for cycles with such refrigeration units.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A gas turbine cycle comprising:
   a gas turbine system including a compressor for compressing air, a combustion system for receiving compressed air from the compressor and a gas turbine for converting the energy of the combustion mixture that leaves the combustion system into work;
   a heat recovery system for receiving exhaust gas from the gas turbine;
   a steam turbine;
   a first flow path for at least one of water and steam at elevated pressure including a first heat exchange flow path disposed in heat exchange relation to said exhaust gas flowing through said heat recovery system, thereby to produce superheated steam therein, and a superheated steam flow path for flowing said superheated steam to said steam turbine, said steam turbine converting the energy of the superheated steam into work;
   an auxiliary compressor operatively coupled to said steam turbine for being driven thereby to compress air to generate injection air at elevated pressure;
   a flow path for said injection air, said injection air flow path being operatively coupled to at least one of the gas turbine compressor discharge and the combustion system of the gas turbine for adding said injection air to said compressed air for increasing the mass flow of fluid into the gas turbine; and
   a flow path for steam exhausted from said steam turbine, said exhaust steam flow path being operatively coupled to at least one of the gas turbine compressor discharge and the combustion system of the gas turbine for increasing the mass flow of fluid into the gas turbine.

2. A gas turbine cycle as in claim 1, wherein the exhaust steam flow path is operatively coupled to said injection air flow path for mixing the exhaust steam with the injection air, and wherein the exhaust steam and the injection air are mixed upstream of said at least one of the gas turbine compressor discharge and the combustion system of the gas turbine.

3. A gas turbine cycle as in claim 1, wherein said injection air flow path includes a second heat exchange flow path disposed in heat exchange relation to said heat recovery system for heating said injection air.

4. A gas turbine cycle as in claim 3, wherein the exhaust steam flow path is operatively coupled to said injection air flow path for mixing the exhaust steam with the injection air, and wherein the exhaust steam and the injection air are mixed upstream of said at least one of the gas turbine compressor discharge and the combustion system of the gas turbine.

5. A gas turbine cycle as in claim 4, wherein the exhaust steam flow path is operatively coupled to said injection air flow path downstream of said second heat exchange flow path.

6. A gas turbine cycle as in claim 1, wherein said heat recovery system comprises a heat recovery boiler.

7. In a gas turbine cycle that includes a gas turbine system including a compressor for compressing air, a combustion system for receiving compressed air from the compressor, a gas turbine for converting the energy of the combustion mixture that leaves the combustion system into work, and a heat recovery system for receiving exhaust gas from the gas turbine, a steam and air injection cycle comprising:

a steam turbine;

a first flow path for at least one of water and steam at elevated pressure including a first heat exchange flow path disposed in heat exchange relation to said exhaust gas flowing through said heat recovery system, thereby to produce superheated steam therein, and a superheated steam flow path for flowing said superheated steam to said steam turbine, said steam turbine converting the energy of the superheated steam into work;

an auxiliary compressor operatively coupled to said steam turbine for being driven thereby to compress air to generate injection air at elevated pressure;

a flow path for said injection air, said injection air flow path being operatively coupled to at least one of the gas turbine compressor discharge and the combustion system of the gas turbine for adding said injection air to said compressed air for increasing the mass flow of fluid into the gas turbine; and a flow path for steam exhausted from said steam turbine, said exhaust steam flow path being operatively coupled to at least one of the gas turbine compressor discharge and the combustion system of the gas turbine for increasing the mass flow of fluid thereinto.

8. A steam and air injection cycle as in claim 7, wherein the exhaust steam flow path is operatively coupled to said injection air flow path for mixing the exhaust steam with the injection air, and wherein the exhaust steam and the injection air are mixed upstream of said at least one of the gas turbine compressor discharge and the combustion system of the gas turbine.

9. A steam and air injection cycle as in claim 7, wherein said injection air flow path includes a second heat exchange flow path disposed in heat exchange relation to said heat recovery system for heating said injection air.

10. A method of augmenting power generation with a gas turbine comprising:

providing a gas turbine system including a compressor for compressing air, a combustion system for receiving compressed air from the compressor and a gas turbine for converting the energy of the combustion mixture that leaves the combustion system into work;

heating at least one of water and steam at elevated pressure with exhaust gas from the gas turbine to produce superheated steam at elevated pressure;

flowing said superheated steam to a steam turbine to convert the energy of the superheated steam into work;

driving an auxiliary compressor with said steam turbine thereby to compress air to generate injection air at elevated pressure;

flowing said injection air to and injecting said injection air into at least one of the gas turbine compressor discharge and the combustion system of the gas turbine to thereby add said injection air to said compressed air for increasing the mass flow of fluid into the gas turbine; and flowing steam exhausted from said steam turbine to at least one of the gas turbine compressor discharge and the combustion system of the gas turbine for increasing the mass flow of fluid into the gas turbine.

11. A method as in claim 10, further comprising mixing the exhaust steam with said injection air upstream of said at least one of the gas turbine compressor discharge and the combustion system of the gas turbine.

12. A method as in claim 10, further comprising heating said injection air with exhaust gas from the gas turbine.

13. A method as in claim 12, further comprising mixing the exhaust steam with said injection air.

14. A method as in claim 13, wherein said mixing step follows said step of heating said injection air and precedes said step of injecting said injection air.

* * * * *